United States Patent
Shuto et al.

(10) Patent No.: US 10,036,353 B2
(45) Date of Patent: Jul. 31, 2018

(54) EXHAUST GAS RECIRCULATION APPARATUS AND ENGINE SYSTEM INCLUDING SUCH EXHAUST GAS RECIRCULATION APPARATUS

(71) Applicant: Mitsubishi Heavy Industries, Ltd, Tokyo (JP)

(72) Inventors: Shintaro Shuto, Tokyo (JP); Tatsuo Ishiguro, Tokyo (JP); Hiromi Komatsu, Tokyo (JP); Yasuhiro Tanaka, Tokyo (JP); Takafumi Tanaka, Tokyo (JP); Satoshi Yamada, Tokyo (JP); Hiroyuki Ueda, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 15/105,527

(22) PCT Filed: Dec. 22, 2014

(86) PCT No.: PCT/JP2014/083866
§ 371 (c)(1),
(2) Date: Jun. 16, 2016

(87) PCT Pub. No.: WO2015/098816
PCT Pub. Date: Jul. 2, 2015

(65) Prior Publication Data
US 2016/0319778 A1 Nov. 3, 2016

(30) Foreign Application Priority Data

Dec. 27, 2013 (JP) .................................. 2013-271608
Sep. 2, 2014 (JP) .................................. 2014-177664

(51) Int. Cl.
*F02M 26/19* (2016.01)
*F02M 35/10* (2006.01)
(Continued)

(52) U.S. Cl.
CPC ............... *F02M 26/19* (2016.02); *B01F 3/02* (2013.01); *B01F 5/0057* (2013.01); *F02B 37/00* (2013.01);
(Continued)

(58) Field of Classification Search
CPC ........ F02M 26/19; F02M 26/04; F02M 26/16; F02M 26/09; F02M 26/10; F02M 26/11;
(Continued)

(56) References Cited

U.S. PATENT DOCUMENTS 3,680,534 A 8/1972 Chavant
4,327,698 A 5/1982 Hamai et al.
(Continued)

FOREIGN PATENT DOCUMENTS

DE 3106588 A1 9/1982
DE 102011110285 A1 12/2012
(Continued)

OTHER PUBLICATIONS

Notification of Transmittal of the Translation of the International Preliminary Report on Patentability, App. No. PCT/JP2014/083866, Filed Dec. 22, 2014, dated Jul. 7, 2016, 14 Pages.
(Continued)

*Primary Examiner* — Lindsay Low
*Assistant Examiner* — George Jin
(74) *Attorney, Agent, or Firm* — Berkeley Law & Technology Group, LLP

(57) ABSTRACT

An exhaust gas recirculation apparatus includes: a fresh air throttle portion that continues from a fresh air inlet portion and is configured to throttle the flow of fresh air; an inner side tube portion that continues from the fresh air throttle portion, has a tubular shape and has an opening end disposed on a side opposite to the fresh air throttle portion; an exhaust gas inlet portion configured to receive a flow of exhaust gas;
(Continued)

a surrounding portion that continues from the exhaust gas inlet portion, surrounds the inner side tube portion, and defines a circumference direction flow path for the exhaust gas extending along an outer circumference surface of the inner side tube portion; and an outlet portion that continues from the surrounding portion, has a tubular shape, and defines a merging flow path configured to receive the flow of the fresh air flowing out from the opening end of the inner side tube portion and the flow of the exhaust gas flowing out from the circumference direction flow path. An annular opening is defined between the opening end of the inner side tube portion and the surrounding portion, the annular opening extending along the opening end of the inner side tube portion and connecting the circumference direction flow path and the merging flow path.

13 Claims, 15 Drawing Sheets

(51) Int. Cl.
 *F02M 26/04* (2016.01)
 *F02B 37/00* (2006.01)
 *B01F 5/00* (2006.01)
 *B01F 3/02* (2006.01)

(52) U.S. Cl.
 CPC ...... *F02M 26/04* (2016.02); *F02M 35/10144* (2013.01); *Y02T 10/144* (2013.01)

(58) Field of Classification Search
 CPC ............. F02M 33/06; F02M 35/10124; F02M 35/10188; F02M 35/10144; F02M 35/10157; F02M 35/10111; F02B 37/00; B01F 5/0486
 See application file for complete search history.

(56) References Cited

U.S. PATENT DOCUMENTS

| | | | | |
|---|---|---|---|---|
| 4,461,150 | A * | 7/1984 | Grohn | F02M 26/19 123/568.17 |
| 7,552,722 | B1 * | 6/2009 | Shieh | F02M 26/19 123/568.17 |
| 8,056,340 | B2 * | 11/2011 | Vaught | F02B 33/44 123/568.17 |
| 2002/0088443 | A1 * | 7/2002 | Marthaler | F02M 26/19 123/568.17 |
| 2008/0314351 | A1 | 12/2008 | Ryrholm et al. | |
| 2009/0165756 | A1 * | 7/2009 | Shieh | B01F 3/02 123/568.17 |
| 2012/0328424 | A1 * | 12/2012 | Berger | F02M 25/06 415/182.1 |
| 2016/0108802 | A1 * | 4/2016 | Smiljanovski | F02B 39/16 60/605.2 |
| 2016/0153404 | A1 * | 6/2016 | Guidi | F02M 26/19 123/568.17 |

FOREIGN PATENT DOCUMENTS

| | | |
|---|---|---|
| DE | 102011117360 A1 | 5/2013 |
| JP | H05223016 A | 8/1991 |
| JP | H03114563 U1 | 11/1991 |
| JP | H09170668 A | 6/1997 |
| JP | H10331723 A | 12/1998 |
| JP | 2000054915 A | 2/2000 |
| JP | 2000097111 A | 4/2000 |
| JP | 2001165002 A | 6/2001 |
| JP | 2002514285 A | 5/2002 |
| JP | 2003511581 A | 3/2003 |
| JP | 2007231906 A | 9/2007 |
| JP | 2008544142 A | 12/2008 |
| JP | 2010222975 A | 10/2010 |
| JP | 2011032880 A | 2/2011 |
| JP | 2011069305 A | 4/2011 |
| JP | 2011106291 A | 6/2011 |
| JP | 2011112038 A | 6/2011 |
| JP | 2011220127 A | 11/2011 |
| JP | 2011252437 A | 12/2011 |
| JP | 2012154280 A | 8/2012 |
| JP | 2013113097 A | 6/2013 |
| WO | 02055866 A1 | 7/2002 |
| WO | 2006126963 A1 | 11/2006 |

OTHER PUBLICATIONS

International Search Report, App. No. PCT/JP2014/083866, Filed Dec. 22, 2014, dated Mar. 24, 2016, 11 Pages.
Partial Supplementary European Search Report, App. No. 14874025.1, dated Dec. 21, 2016, 6 Pages.
Partial Supplementary European Search Report, EP App. No. 14874025.1, dated Mar. 31, 2017, 7 Pages.
Extended European Search Report, App. No. 14874025.1, dated Jul. 7, 2017, 10 Pages.
Office Action, App. No. 201480070541.X, dated Nov. 29, 2017, 28 Pages.
Office Action, JP App. No. 2014-177664, dated May 18, 2018, 10 Pages.

* cited by examiner

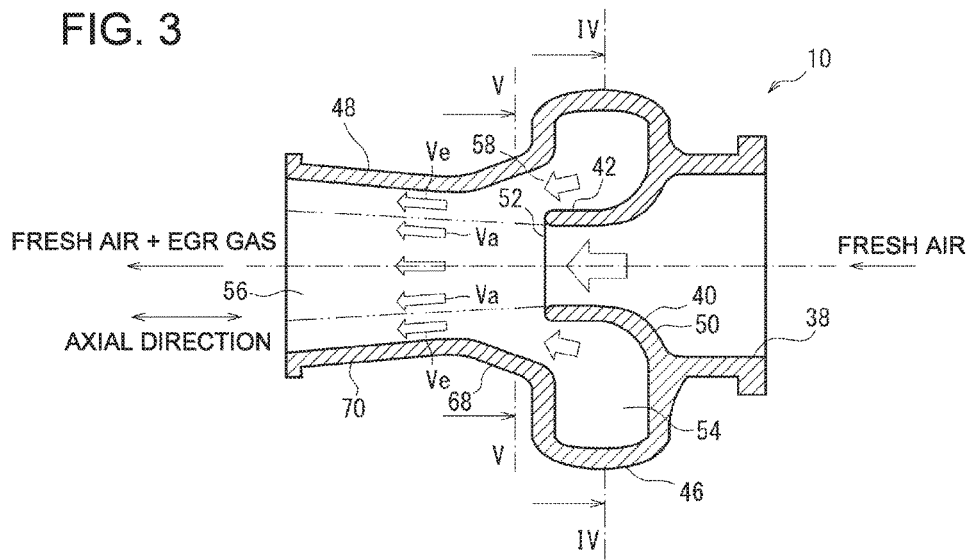
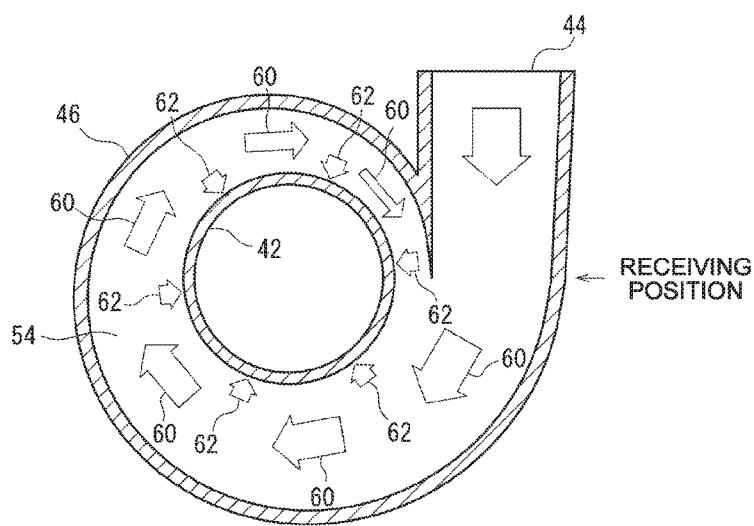

AXIAL DIRECTION

EXHAUST GAS RECIRCULATION APPARATUS AND ENGINE SYSTEM INCLUDING SUCH EXHAUST GAS RECIRCULATION APPARATUS

TECHNICAL FIELD

The present disclosure relates to an exhaust gas recirculation apparatus that merges exhaust gas discharged from an engine with fresh air supplied to the engine, and to an engine system including the exhaust gas recirculation apparatus.

BACKGROUND ART

Exhaust gas recirculation (hereinafter also referred to as EGR) is known as a technique of reducing nitrogen oxides (NOx) in exhaust gas discharged from a diesel engine. An engine system employing the EGR includes an exhaust gas recirculation apparatus (EGR apparatus) that merges a part of the exhaust gas discharged from an engine (EGR gas) with fresh air supplied to the engine. The fresh air and the EGR gas merged by the EGR apparatus are supplied to the engine.

Generally, pressure difference between the EGR gas and the fresh air is utilized to introduce the EGR gas into the EGR apparatus. Thus, it is easy to introduce the EGR gas into the EGR apparatus while the engine is in a low load range involving a large pressure difference between the EGR gas and the fresh air, but it is difficult to introduce the EGR gas into the EGR apparatus while the engine is in a high load range involving a small pressure difference between the EGR gas and the fresh air.

In view of this, in an EGR apparatus disclosed in PTL 1, a double pipe structure is formed by an EGR path and an air supply path. In the EGR apparatus, the EGR gas is sucked by a mechanism of an ejector, so that the introduction of the EGR gas is facilitated.

When the EGR gas is supplied to a multi-cylinder engine, mixing between the EGR gas and the fresh air is an important factor. Thus, in an exhaust gas recirculation apparatus disclosed in PTL 2, an EGR gas introduction chamber having an annular shape is formed around an EGR gas mixing pipe forming an air intake path. Furthermore, an EGR gas supply port connecting the air intake path and the EGR gas introduction chamber is formed in the EGR gas mixing pipe. A plate is disposed in the EGR gas mixing pipe, and the EGR gas and the fresh air each collide with the plate to be mixed while swirling.

CITATION LIST

Patent Literature

Patent Document 1: Japanese Patent Application Laid-open No. 2011-112038
Patent Document 2: Japanese Patent Application Laid-open No. H5-223016

SUMMARY

Problems to be Solved

However, in the EGR apparatus described in PTL 1, a flowrate of the EGR gas flowing into the EGR apparatus is reduced when an engine load increases and pressure of the fresh air compressed by a compressor increases.

In the exhaust gas recirculation apparatus described in PTL 2, the exhaust gas flowed into the EGR gas mixing pipe through the EGR gas supply port includes a velocity component along a radial direction of the EGR gas mixing pipe, and thus collides with the fresh gas flowing in an axial direction of the EGR gas mixing pipe. This leads to a pressure loss of the EGR gas, resulting in reduction in the flowrate of the EGR gas.

An object of at least one embodiment of the present invention is to provide an exhaust gas recirculation apparatus and an engine system that increase a flowrate of exhaust gas merging with fresh air.

Solution to the Problems

At least one embodiment of the present invention provides an exhaust gas recirculation apparatus configured to merge exhaust gas discharged from an engine with fresh air supplied to the engine and including: a fresh air inlet portion configured to receive a flow of the fresh air; a fresh air throttle portion that continues from the fresh air inlet portion and is configured to throttle the flow of the fresh air; an inner side tube portion that continues from the fresh air throttle portion, has a tubular shape and has an opening end disposed on a side opposite to the fresh air throttle portion; an exhaust gas inlet portion configured to receive a flow of the exhaust gas; a surrounding portion that continues from the exhaust gas inlet portion, surrounds the inner side tube portion, and defines a circumference direction flow path for the exhaust gas extending along an outer circumference surface of the inner side tube portion; and an outlet portion that continues from the surrounding portion, has a tubular shape, and defines a merging flow path configured to receive the flow of the fresh air flowing out from the opening end of the inner side tube portion and the flow of the exhaust gas flowing out from the circumference direction flow path. An annular opening is defined between the opening end of the inner side tube portion and the surrounding portion, the annular opening extending along the opening end of the inner side tube portion and connecting the circumference direction flow path and the merging flow path.

In this configuration, the fresh air throttle portion throttles the flow of the fresh air, whereby static pressure of the fresh air flowing out from the opening end of the inner side tube portion drops. Thus, the exhaust gas flowing into the merging flow path through the circumference direction flow path increases, whereby the flowrate of the exhaust gas merging with the fresh air increases.

In this configuration, the inner side tube portion has a tubular shape, and the exhaust gas, flowing along the inner side tube portion into the merging flow path through the annular opening from the circumference direction flow path, flows in a direction along the axial direction of the inner side tube portion. Thus, the flow of the exhaust gas is prevented from colliding with the flow of the fresh air, flowing out from the opening end of the inner side tube portion along the axial direction of the inner side tube portion, in the merging flow path, whereby the pressure loss of the exhaust gas is prevented. This also contributes to an increase in the flowrate of the exhaust gas merging with the fresh air.

In some embodiments, a flow path cross-sectional area of the exhaust gas inlet portion, a flow path cross-sectional area of the circumference direction flow path, and an area of the annular opening are set in such a manner that a flow velocity of the fresh air flowing out from the opening end of the inner side tube portion becomes equal to a flow velocity of the exhaust gas flowing out from the annular opening when a load of the engine is within a predetermined range.

In this configuration, the flow velocity of the fresh air and the flow velocity of the exhaust gas are set to be equal in the merging flow path to reduce shearing force produced between the flow of the fresh air and the flow of the exhaust gas, whereby the pressure loss of the exhaust gas is reduced. Thus, the exhaust gas flowing into the merging flow path through the circumference direction flow path is increased, whereby the flowrate of the exhaust gas merging with the fresh air increases.

In some embodiments, at least one protruding portion protruding from an inner circumference surface of the outlet portion is further provided.

In this configuration, the protruding portion generates a vortex in the flows of the fresh air and the exhaust gas, whereby the mixing of the fresh air and the exhaust gas is facilitated.

In some embodiments, the circumference direction flow path has a flow path cross-sectional area that decreases gradually from a receiving position where the circumference direction flow path receives the flow of the exhaust gas in a circumference direction of the inner side tube portion.

In this configuration, a uniform flowrate of the exhaust gas flowing through the annular opening into the merging flow path from the circumference direction flow path through the annular opening can be achieved regardless of a circumference direction position of the annular opening. Thus, the exhaust gas smoothly flows into the merging flow path, whereby the flowrate of the exhaust gas merging with the fresh air increases.

In some embodiments, the exhaust gas inlet portion is configured in such a manner that the exhaust gas flows into the receiving position of the circumference direction flow path along a tangential direction of the inner side tube portion.

In this configuration, the exhaust gas flows into the receiving position of the circumference direction flow path along the tangential direction, whereby the exhaust gas smoothly flows in the circumference direction of the inner side tube portion. Thus, the uniform flowrate of the exhaust gas flowing into the merging flow path through the annular opening can be more effectively achieved regardless of the circumference direction position. As a result, the exhaust gas smoothly flows into the merging flow path, whereby the flowrate of the exhaust gas merging with the fresh air increases.

At least one embodiment of the present invention provides an engine system including an engine, and an exhaust gas recirculation apparatus configured to merge at least a part of exhaust gas discharged from the engine with fresh air supplied to the engine. The exhaust gas recirculation apparatus includes: a fresh air inlet portion configured to receive a flow of the fresh air; a fresh air throttle portion that continues from the fresh air inlet portion and is configured to throttle the flow of the fresh air; an inner side tube portion that continues from the fresh air throttle portion, has a tubular shape and has an opening end disposed on a side opposite to the fresh air throttle portion; an exhaust gas inlet portion configured to receive a flow of the exhaust gas; a surrounding portion that continues from the exhaust gas inlet portion, surrounds the inner side tube portion, and defines a circumference direction flow path for the exhaust gas extending along an outer circumference surface of the inner side tube portion; and an outlet portion that continues from the surrounding portion, has a tubular shape, and defines a merging flow path configured to receive the flow of the fresh air flowing out from the opening end of the inner side tube portion and the flow of the exhaust gas flowing out from the circumference direction flow path. An annular opening is defined between the opening end of the inner side tube portion and the surrounding portion, the annular opening extending along the opening end of the inner side tube portion and connecting the circumference direction flow path and the merging flow path.

In this configuration, in the exhaust gas recirculation apparatus, the fresh air throttle portion throttles the flow of the fresh air, whereby static pressure of the fresh air flowing out from the opening end of the inner side tube portion drops. Thus, the exhaust gas flowing into the merging flow path through the circumference direction flow path increases, whereby the flowrate of the exhaust gas merging with the fresh air increases.

In this configuration, the inner side tube portion has a tubular shape, and the exhaust gas flowing into the merging flow path through the annular opening from the circumference direction flow path along the inner side tube portion flows in a direction along the axial direction of the inner side tube portion. Thus, the flow of the exhaust gas is prevented from colliding with the flow of the fresh air, flowing out from the opening end of the inner side tube portion along the axial direction of the inner side tube portion, in the merging flow path, whereby the pressure loss of the exhaust gas is prevented. This also contributes to an increase in the flowrate of the exhaust gas merging with the fresh air.

With these features, the flowrate of the exhaust gas supplied to the engine can be increased.

At least one embodiment of the present invention provides an exhaust gas recirculation apparatus including: an exhaust gas recirculation tubular pipe to which an EGR control valve having two outlets, a throttle valve, and an air supply manifold are connected; and a mixing facilitating portion disposed between the EGR control valve and the exhaust gas recirculation tubular pipe. The mixing facilitating portion includes two communication pipes connected to the exhaust gas recirculation tubular pipe in two different tangential directions, respectively. The two tangential directions are mirror symmetric with each other in a cross-sectional view of the exhaust gas recirculation tubular pipe.

In this configuration, the exhaust gas forms a swirling flow in the exhaust gas recirculation tubular pipe, whereby an effect of facilitating the mixing of the exhaust gas and the fresh air is obtained.

In some embodiments, the inner side tube portion is provided with a plurality of notched portions formed along a circumference direction of the inner side tube portion, the plurality of notched portions extending from the opening end toward an upstream side of the inner side tube portion.

In this configuration, at the point where the exhaust gas that has passed through the circumference direction flow path and the fresh air that has passed through the inner side tube portion merge, a streamwise vortex of the exhaust gas is generated by the notched portion extending from the opening end toward the upstream side of the inner side tube portion. Thus, the mixing of the exhaust gas and the fresh air can be facilitated while the pressure loss is prevented.

The plurality of notched portions are formed at an equal interval along the circumference direction of the inner side tube portion.

In this configuration, the exhaust gas and the fresh air can be relatively uniformly mixed regardless of the position in the circumference direction.

Each of the plurality of notched portions extends in parallel with an axial direction of the inner side tube portion.

In this configuration, a streamwise vortex of the exhaust gas can be effectively generated by the notched portions extending in parallel with the axial direction of the inner side tube portion, when the swirling component of the exhaust gas flowing in the circumference direction flow path is relatively small or is approximately zero. Thus, high effects of preventing the pressure loss and preventing the mixing of the exhaust gas and the fresh air can be obtained when the swirling component of the exhaust gas flowing in the circumference direction flow path is relatively small or is approximately zero.

Each of the plurality of notched portions extends while being inclined with respect to an axial direction of the inner side tube portion, toward a downstream side in a scroll direction of the circumference direction flow path.

In this configuration, a streamwise vortex of the exhaust gas can be effectively generated by the notched portions extending while being inclined with respect to the axial direction of the inner side tube portion, toward a downstream side in a scroll direction of the circumference direction flow path, when the swirling component of the exhaust gas flowing in the circumference direction flow path is relatively large. Thus, high effects of preventing the pressure loss and preventing the mixing of the exhaust gas and the fresh air can be obtained when the swirling component of the exhaust gas flowing in the circumference direction flow path is relatively large.

The opening end has a wave shape with which a distance between the opening end and the surrounding portion in a radial direction of the inner side tube portion periodically changes along a circumference direction of the inner side tube portion.

In this configuration, the distance between the opening end and the surrounding portion in the radial direction of the inner side tube portion periodically changes along the circumference direction of the inner side tube portion. Thus, a streamwise vortex of the exhaust gas and a streamwise vortex of the fresh air are alternately generated along the circumference direction of the inner side tube portion at the position where the exhaust gas and the fresh air merge. Thus, the mixing of the exhaust gas and the fresh air can be facilitated while the pressure loss is prevented.

In some embodiments, an angle $\alpha$ between a straight line A and a straight line C is larger than an angle $\beta$ between a straight line B and the straight line C, where the straight line A is a straight line connecting an axis of the inner side tube portion and a first position on the opening end where the distance to the surrounding portion is the smallest, the straight line B is a straight line connecting the axis of the inner side tube portion and one of second positions on the opening end where the distance to the surrounding portion is the smallest, the one of second positions being disposed adjacent to and on a downstream side of the first position in a scroll direction of the circumference direction flow path, and the straight line C is a straight line connecting the axis of the inner side tube portion and one of third positions on the opening end where the distance to the surrounding portion is the largest, the one of third positions being positioned between the first position and the second position in the scroll direction of the circumference direction flow path.

In this configuration, each wave of the opening end having the wave shape is inclined so that $\alpha > \beta$ is satisfied, whereby a streamwise vortex of the exhaust gas can be effectively generated when the swirling component of the exhaust gas flowing in the circumference direction flow path is relatively large. Thus, high effects of preventing the pressure loss and preventing the mixing of the exhaust gas and the fresh air can be obtained when the swirling component of the exhaust gas flowing in the circumference direction flow path is relatively large.

Advantageous Effects

At least one embodiment of the present invention provides an exhaust gas recirculation apparatus and an engine system that increase a flowrate of exhaust gas merging with fresh air.

BRIEF DESCRIPTION OF DRAWINGS

FIG. 3 is a schematic longitudinal cross-sectional view of the exhaust gas recirculation apparatus in FIG. 2.

FIG. 4 is a schematic cross-sectional view taken along line IV-IV in FIG. 3.

DETAILED DESCRIPTION

Figure 1:
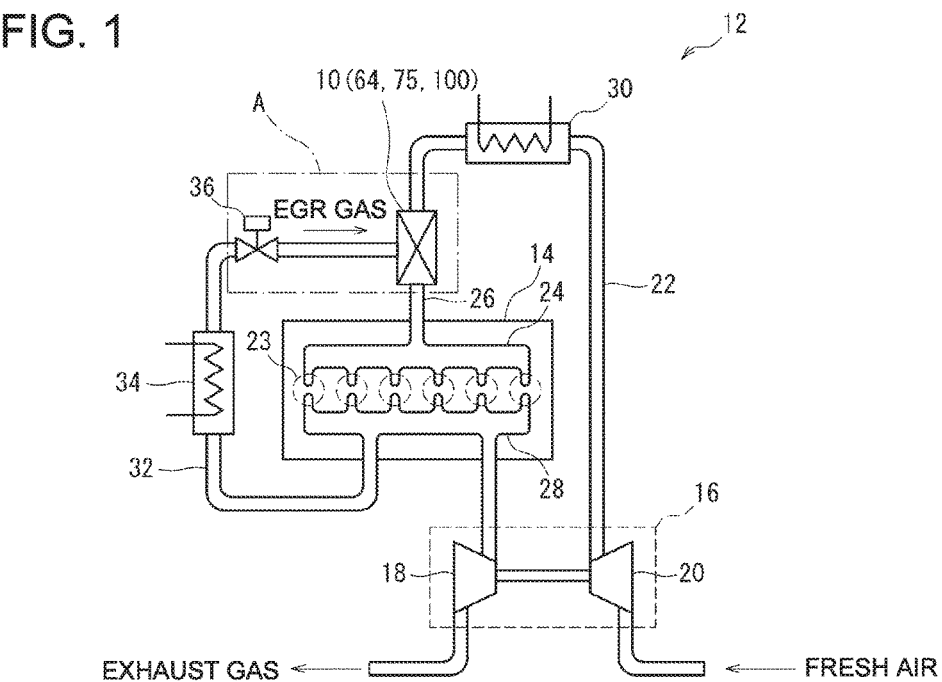
FIG. 1 is diagram illustrating a schematic configuration of an engine system employing an exhaust gas recirculation apparatus according to at least one embodiment of the present invention.

Embodiments of the present invention are described below with reference to the attached drawings. Sizes, materials, shapes, and positional relationships of components described in the embodiments or illustrated in the drawings are merely examples for description and the scope of the present invention is not limited thereto.

FIG. 1 is a diagram illustrating a schematic configuration of an engine system 12 employing an exhaust gas recirculation apparatus 100 of a conventional technique or an exhaust gas recirculation apparatus 10 according to at least one embodiment of the present invention.

As illustrated in FIG. 1, the engine system 12 includes an engine 14 and the exhaust gas recirculation apparatus 10.

The exhaust gas recirculation apparatus 10 is configured to merge at least a part of exhaust gas discharged from the engine 14 (hereinafter also referred to as EGR gas) with fresh air supplied to the engine 14.

In some embodiments, the engine system 12 includes a turbo charger 16. The turbo charger 16 includes a turbine 18 and a compressor 20 that are coupled to each other, and is configured to compress the fresh air by using energy of the part of the exhaust gas discharged from the engine 14.

In this configuration, an upstream side intake path 22, through which the compressed fresh air is supplied to the exhaust gas recirculation apparatus 10, is disposed between the compressor 20 in the turbo charger 16 and the exhaust gas recirculation apparatus 10. Thus, the exhaust gas recirculation apparatus 10 merges the EGR gas with the fresh air compressed by the turbo charger 16.

In this configuration, a downstream side intake path 26 is disposed between an air supply manifold 24, for supplying the fresh air and the EGR gas to cylinders 23 of the engine 14, and the exhaust gas recirculation apparatus 10. Mixed gas of the fresh air and the EGR gas is supplied to the engine 14 through the downstream side intake path 26. The exhaust gas recirculation apparatus 10 and the air supply manifold 24 may be directly connected to each other.

In some embodiments, the upstream side intake path 22 is provided with an intake air cooling heat exchanger 30 for cooling the compressed fresh air.

In some embodiments, a discharge air recirculating path 32 is provided that connects a discharge manifold 28 that collects the exhaust gas discharged from the cylinders 23 of the engine 14 and the exhaust gas recirculation apparatus 10. The discharge air recirculating path 32 is provided with a discharge air cooling heat exchanger 34 for cooling the EGR gas and a control valve 36 for adjusting a flowrate of the EGR gas. The opening of the control valve 36 is adjusted in accordance with a load of the engine 14, for example.

A fuel is supplied to the cylinders 23 of the engine 14 by an unillustrated fuel supply mechanism. For example, the fuel is a diesel fuel.

Figure 9:
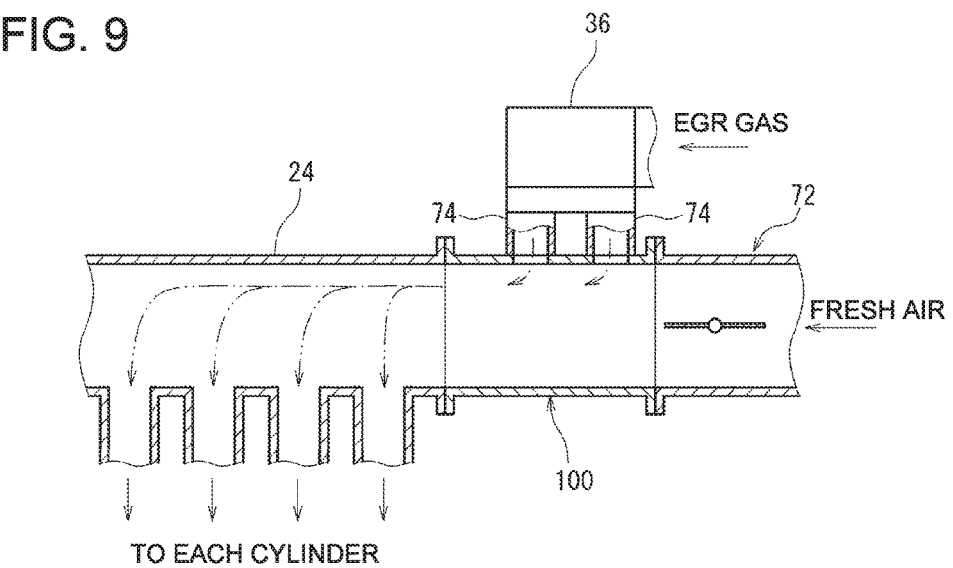
FIG. 9 is an enlarged view of a portion A in FIG. 1, and is a cross-sectional view of a main portion in a conventional technique.

FIG. 9 is a diagram schematically illustrating the exhaust gas recirculation apparatus 100 according to a conventional technique.

The control valve 36, the air supply manifold 24, and a throttle valve 72 are connected to the exhaust gas recirculation apparatus 100. A forked pipe including two pipes 74 connects an outlet of the control valve 36 and the exhaust gas recirculation apparatus 100. The two pipes 74 are disposed while being separated from each other in an axial direction of the exhaust gas recirculation apparatus 100, and are each connected to the exhaust gas recirculation apparatus 100 in the radial direction.

Figure 2:
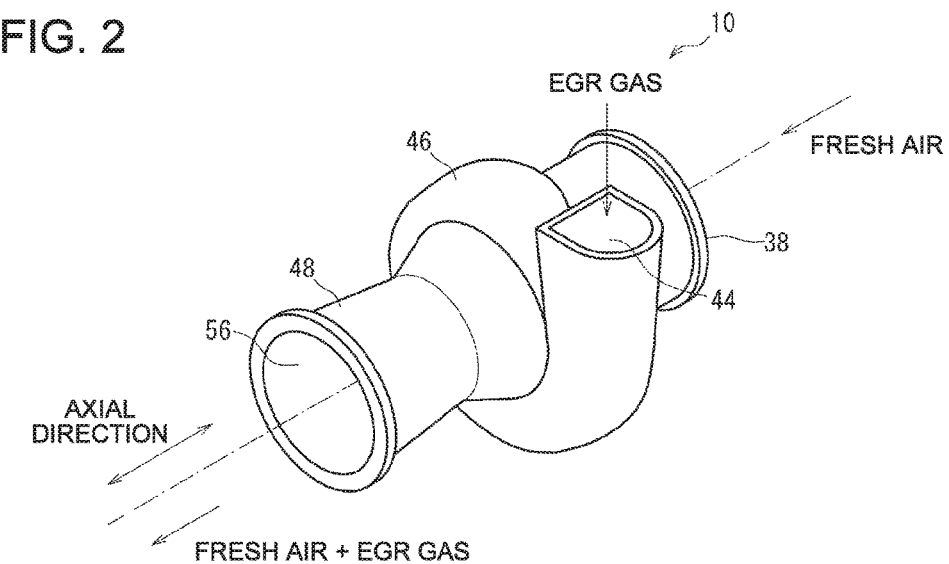
FIG. 2 is a schematic perspective view of the exhaust gas recirculation apparatus according to at least one embodiment of the present invention.
Figure 5:
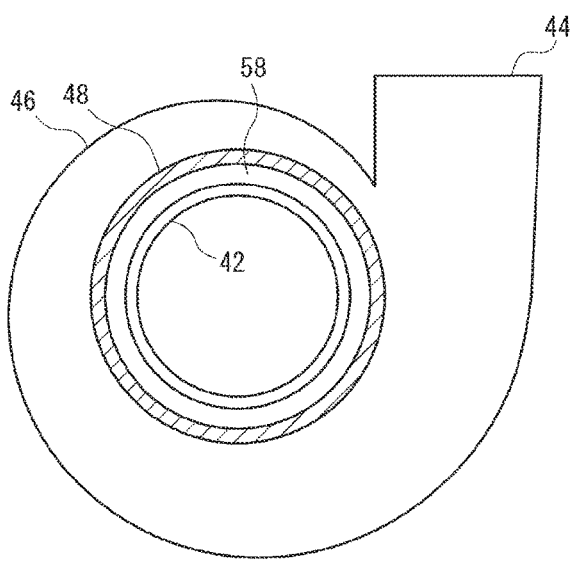
FIG. 5 is a schematic cross-sectional view taken along line V-V in FIG. 3.

FIG. 2 is a schematic perspective view of the exhaust gas recirculation apparatus 10. FIG. 3 is a schematic longitudinal cross-sectional view of the exhaust gas recirculation apparatus 10. FIG. 4 is a schematic cross-sectional view taken along line IV-IV in FIG. 3. FIG. 5 is a schematic cross-sectional view taken along line V-V in FIG. 3.

As illustrated in FIG. 2 to FIG. 5, the exhaust gas recirculation apparatus 10 includes a fresh air inlet portion 38, a fresh air throttle portion 40, an inner side tube portion 42, an exhaust gas inlet portion 44, a surrounding portion 46, and an outlet portion 48.

The fresh air inlet portion 38 is configured to receive a flow of the fresh air supplied to the engine 14. For example, the fresh air inlet portion 38 is formed of a cylindrical tube. In some embodiments, the fresh air inlet portion 38 is configured to receive the flow of the fresh air compressed by the turbo charger 16.

The fresh air throttle portion 40 continues from the fresh air inlet portion 38 and is configured to throttle the flow of the fresh air. For example, the fresh air throttle portion 40 includes an inlet end and an outlet end that has a smaller diameter than the inlet end. The cross-sectional area of the fresh air throttle portion 40 gradually decreases from the inlet end to the outlet end.

The inner side tube portion 42 has a tubular shape, and continues from the outlet end of the fresh air throttle portion 40. The inner side tube portion 42 has an opening end 52 on a side opposite to the fresh air throttle portion 40.

The exhaust gas inlet portion 44 is configured to receive the flow of the EGR gas (exhaust gas). For example, the exhaust gas inlet portion 44 has a cylindrical shape.

A surrounding portion 46 continues from the exhaust gas inlet portion 44, surrounds the inner side tube portion 42, and defines a circumference direction flow path 54 extending along an outer circumference surface of the inner side tube portion 42.

The outlet portion 48 has a cylindrical shape, and continues from the surrounding portion 46. The outlet portion 48 defines a merging flow path 56 configured to receive the flow of the fresh air flowed out from the opening end of the inner side tube portion 42 and the flow of the exhaust gas flowed out from the circumference direction flow path.

The merging flow path 56 and the circumference direction flow path 54 are connected to each other through an annular opening 58 defined between the opening end 52 of the inner side tube portion 42 and the surrounding portion 46. The opening 58 extends along the opening end 52 of the inner side tube portion 42 and is formed as an inlet of the exhaust gas flowing into the merging flow path 56.

In the configuration described above, the fresh air throttle portion 40 throttles the flow of the fresh air, whereby static pressure of the fresh air flowing out from the opening end 52 of the inner side tube portion 42 drops. Thus, the exhaust gas flowing into the merging flow path 56 through the circumference direction flow path 54 increases, whereby the flowrate of the exhaust gas merging with the fresh air increases.

In the configuration described above, the inner side tube portion 42 has the tubular shape, and the exhaust gas, flowing into the merging flow path 56 from the circumference direction flow path 54 through the annular opening 58 along the inner side tube portion 42, flows in a direction along the axial direction of the inner side tube portion 42. Thus, the flow of the exhaust gas flowing in the merging flow path 56 is prevented from colliding with the flow of the fresh air flowing out from the opening end 52 of the inner side tube portion 42 along the axial direction of the inner side tube portion 42, and thus the pressure loss of the exhaust gas is prevented. This also contributes to an increase in the flowrate of the exhaust gas merging with the fresh air.

The exhaust gas recirculation apparatus 10 increases the flowrate of the exhaust gas merging with the fresh air as described above, whereby the flowrate of the exhaust gas supplied to the engine 14 can be increased. As a result, an attempt to reduce NOx and the like discharged from the engine 14 or improve fuel consumption can be facilitated.

In some embodiments, the inner side tube portion 42 has the uniform inner and outer diameters along the axial direction of the inner side tube portion 42, and has the inner and the outer circumference surfaces extending along the axial direction of the inner side tube portion 42.

In some embodiments, the fresh air throttle portion 40 has a circumference wall 50 that is provided between the inlet and the outlet ends of the fresh air throttle portion 40 and has a trumpet shape having an inner diameter gradually decreasing from the inlet end toward the outlet end. An outer circumference surface, having a round shaped cross section, of the circumference wall 50 serves as an inner circumference side edge of the circumference direction flow path 54, and enables the exhaust gas to smoothly flow in the circumference direction flow path 54.

In some embodiments, a flow path cross-sectional area of the exhaust gas inlet portion 44, a flow path cross-sectional area of the circumference direction flow path 54, and an area of the annular opening 58 are set in such a manner that a flow velocity Va of the fresh air flowing out from the opening end 52 of the inner side tube portion 42 and a flow velocity Ve of the exhaust gas flowing out from the annular opening 58 become equal to each other as illustrated in FIG. 3, when a load of the engine 14 is within a predetermined load range.

The flow path cross-sectional area of the circumference direction flow path 54 is a cross-sectional area along the radial and axial directions of the inner side tube portion 42, and thus is a cross-sectional area orthogonal to the circumference direction of the inner side tube portion 42.

For example, the predetermined load range is a range between 65% and 85% both inclusive. For example, the load of the engine 14 can be obtained by looking up map data, representing the relationship among the accelerator position, the rotation speed of the engine 14, and the load of the engine 14, with the accelerator position and the rotation speed of the engine 14.

In this configuration, the flow velocity Va of the fresh air and the flow velocity Ve of the exhaust gas are set to be equal to each other in the merging flow path 56, whereby the shearing force produced between the flow of the fresh air and the flow of the exhaust gas is reduced, so that the pressure loss of the exhaust gas is reduced. Thus, the exhaust gas flowing into the merging flow path 56 through the circumference direction flow path 54 increases, whereby the flowrate of the exhaust gas merging with the fresh air increases.

A one dot chain line in FIG. 3 represents the axis of the inner side tube portion 42, and two-dot chain lines in FIG. 3 schematically represent boundaries between the flow of the fresh air and the flow of the exhaust gas.

In some embodiments, a distance between the opening end 52 and the surrounding portion 46 of the inner side tube portion 42 in the annular opening 58 is uniform in the circumference direction of the inner side tube portion 42.

In some embodiments, as illustrated in FIG. 4, the flow path cross-sectional area of the circumference direction flow path 54 decreases from a receiving position where the circumference direction flow path 54 receives the flow of the exhaust gas in the circumference direction of the inner side tube portion 42.

In this configuration, the exhaust gas that has flowed into the circumference direction flow path 54 flows along the circumference direction flow path 54 as indicated by arrows 60, and gradually flows into the merging flow path 56 from the circumference direction flow path 54 through the annular opening 58 as indicated by arrows 62. Thus, the uniform flowrate of the exhaust gas flowing into the merging flow path 56 from the circumference direction flow path 54 through the annular opening 58 can be achieved regardless of the circumference direction position of the annular opening 58. As a result, the exhaust gas smoothly flows into the merging flow path 56, and the flowrate of the exhaust gas merging with the fresh air increases.

The arrows 62, pointing inward of the inner side tube portion 42 in the radial direction in FIG. 4, actually extend in the axial direction of the inner side tube portion 42.

In some embodiments, the exhaust gas inlet portion 44 is configured in such a manner that the exhaust gas flows into the receiving position of the circumference direction flow path 54 along the tangential direction of the inner side tube portion 42.

In this configuration, the exhaust gas flows into the receiving position of the circumference direction flow path 54 along the tangential direction, whereby the exhaust gas smoothly flows into the circumference direction of the inner side tube portion 42. Thus, the uniform flowrate of the exhaust gas flowing into the merging flow path 56 through the annular opening 58 can be more effectively achieved regardless of the circumference direction position. Thus, the exhaust gas smoothly flows into the merging flow path 56, whereby the flowrate of the exhaust gas merging with the fresh air increases.

Figure 6:
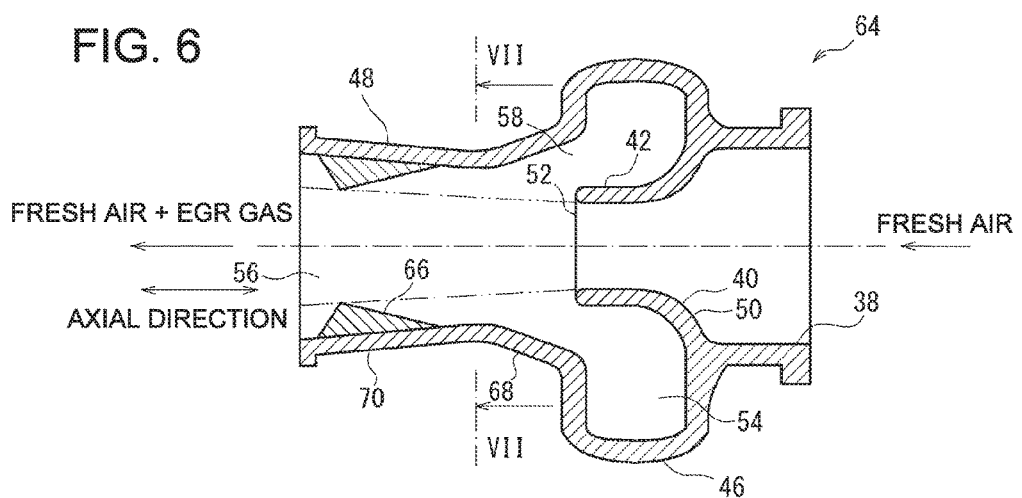
FIG. 6 is a schematic longitudinal cross-sectional view of an exhaust gas recirculation apparatus according to some embodiments.
Figure 7:
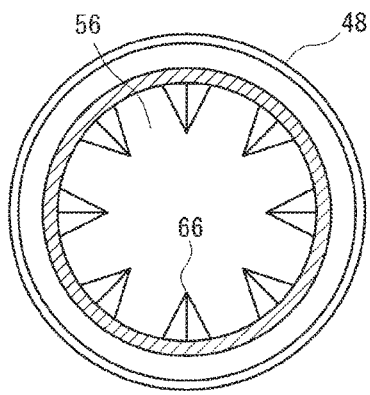
FIG. 7 is a schematic cross-sectional view taken along line VII-VII in FIG. 6.

FIG. 6 is a schematic longitudinal cross-sectional view of an exhaust gas recirculation apparatus 64 according to some embodiments. FIG. 7 is a schematic cross-sectional view taken along line VII-VII in FIG. 6.

As illustrated in FIG. 6 and FIG. 7, the exhaust gas recirculation apparatus 64 further includes at least one protruding portion 66 protruding from an inner circumference surface of the outlet portion 48. In some embodiments, a plurality of the protruding portions 66 are arranged in the circumference direction of the outlet portion 48.

In this configuration, the protruding portions 66 generate a vortex in the flows of the fresh air and the exhaust gas to facilitate the mixing of the fresh air and the exhaust gas.

Figure 8:
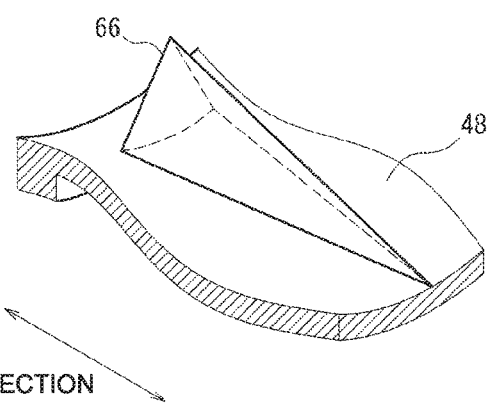
FIG. 8 is a perspective view schematically illustrating one protruding portion in FIG. 6 and a part of an outlet portion.

FIG. 8 is a perspective view schematically illustrating one protruding portion 66 together with a part of the outlet portion 48. As illustrated in FIG. 8, the protruding portion 66 has a tetrahedron shape having a longitudinal direction extending along the axial direction of the outlet portion 48 and a shorthand direction extending along the radial direction of the outlet portion 48.

In some embodiments, the outlet portion 48 includes a reduced diameter portion 68 that is on the surrounding portion 46 side and has an inner diameter reducing as it gets farther in the axial direction of the inner side tube portion 42 from the opening end 52 of the inner side tube portion 42. In some embodiments, the outlet portion 48 has an increased diameter portion 70 that is on a side opposite to the surrounding portion 46, and has an inner diameter increasing from the opening end 52 of the inner side tube portion 42 in the axial direction of the inner side tube portion 42. With the increased diameter portion 70, the pressure of the flow of the each of the fresh air and the exhaust gas flowing out from the merging flow path 56 can be adjusted.

Figure 10:
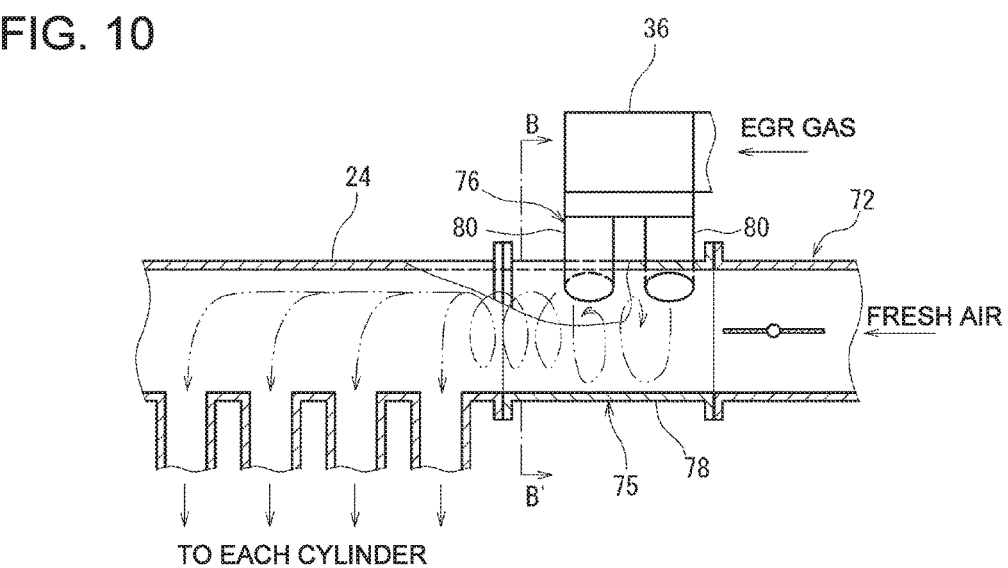
FIG. 10 is an enlarged view of the portion A in FIG. 1, and is a cross-sectional view of a main portion schematically illustrating one embodiment of the present invention.
Figure 11:
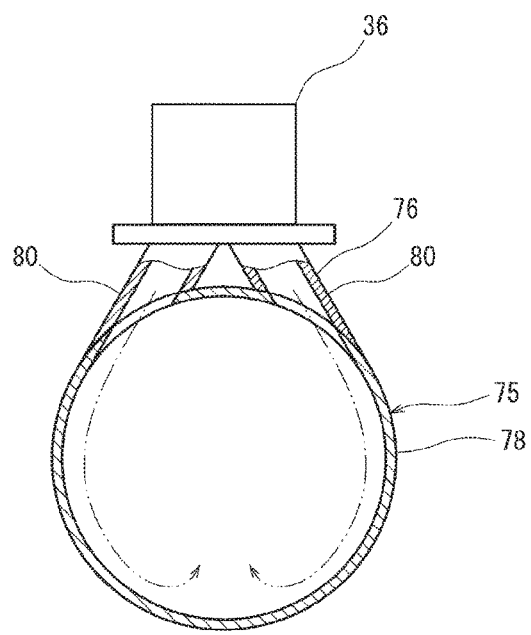
FIG. 11 is a cross-sectional view along B-B' in FIG. 10.

FIG. 10 is a schematic cross-sectional view of an exhaust gas recirculation apparatus 75 according to some embodiments, and FIG. 11 is a cross-sectional view along B-B' in FIG. 10.

The exhaust gas recirculation apparatus 75 illustrated in FIG. 10 is different from the exhaust gas recirculation apparatus illustrated in FIG. 9 in that a mixing facilitating pipe (mixing facilitating portion) 76 is provided instead of a forked pipe.

More specifically, the exhaust gas recirculation apparatus 75 includes: an exhaust gas recirculation tubular pipe 78 to which the EGR control valve 36 that has two outlets, the throttle valve 72, and the air supply manifold 24 are connected; and the mixing facilitating portion 76 disposed between the EGR control valve 36 and the exhaust gas recirculation tubular pipe 78.

The mixing facilitating portion 76 includes two communication pipes 80 that are connected to the exhaust gas recirculation tubular pipe 78 in two different tangential directions. The two tangential directions are mirror symmetrical with each other in the lateral cross-sectional view of the exhaust gas recirculation tubular pipe 78 as illustrated in FIG. 11. In other words, the two communication pipes 80 are arranged to be mirror symmetrical with each other in the lateral cross-sectional view of the exhaust gas recirculation tubular pipe 78.

In this configuration, the exhaust gas forms a swirling flow in the exhaust gas recirculation tubular pipe 78, whereby an effect of facilitating the mixing of the exhaust gas and the fresh air can be obtained.

In some embodiments, a distance between the two communication pipes 80 increases as they get closer to the exhaust gas recirculation tubular pipe 78 in the lateral cross-sectional view of the exhaust gas recirculation tubular pipe 78. An angle between the two communication pipes 80 is equal to or smaller than 90°. In some embodiments, the two communication pipes 80 are separated from each other in the axial direction of the exhaust gas recirculation tubular pipe 78.

Figure 12:
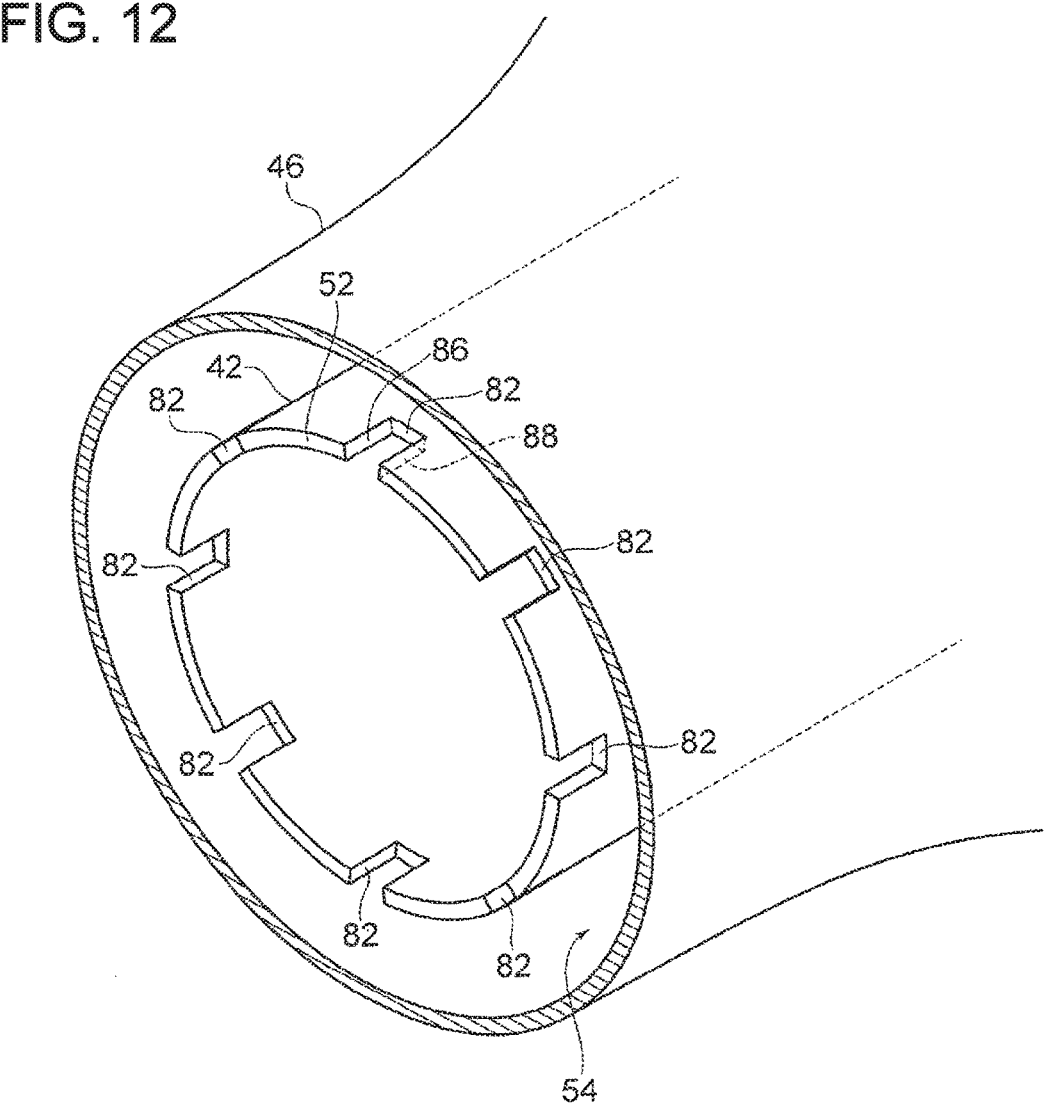
FIG. 12 is a diagram illustrating an example of a configuration of an inner side tube portion of the exhaust gas recirculation apparatus illustrated in FIG. 3 to FIG. 6, and is a cross-sectional perspective view of the exhaust gas recirculation apparatus illustrating a cross section orthogonal to an axis of the inner side tube portion at a position of an opening end of the inner side tube portion.
Figure 13:
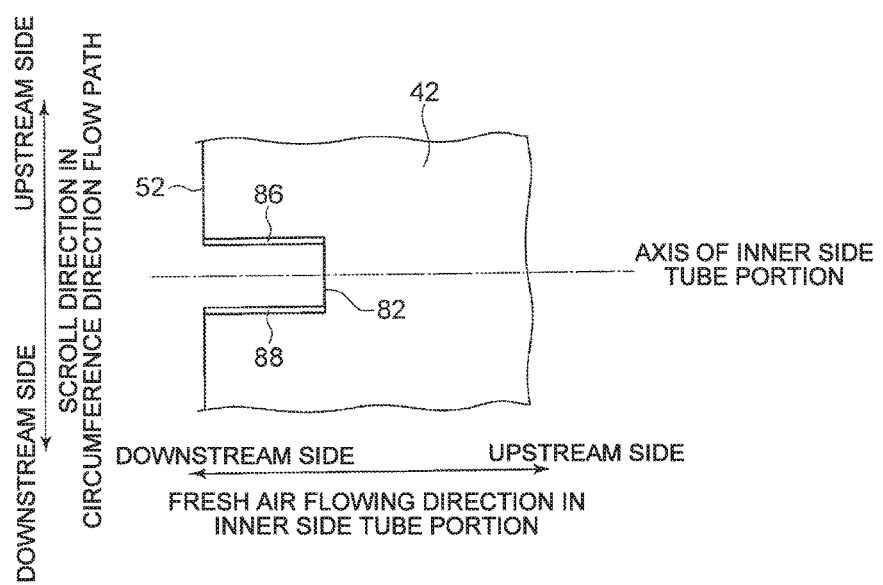
FIG. 13 is a diagram illustrating a notched portion of the inner side tube portion illustrated in FIG. 12 as viewed from an outer side of the inner side tube portion in a radial direction.
Figure 14:
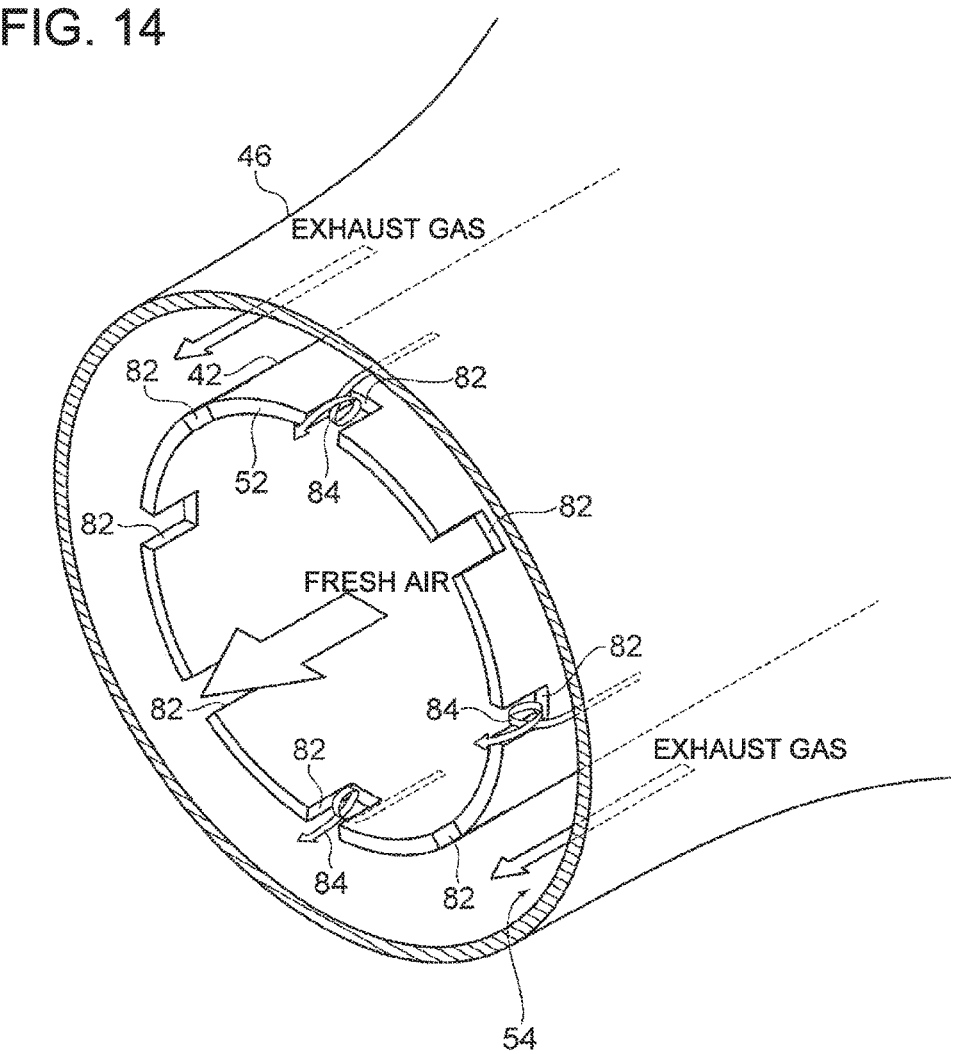
FIG. 14 is a schematic view illustrating how a streamwise vortex is generated in the notched portion illustrated in FIG. 12.
Figure 15:
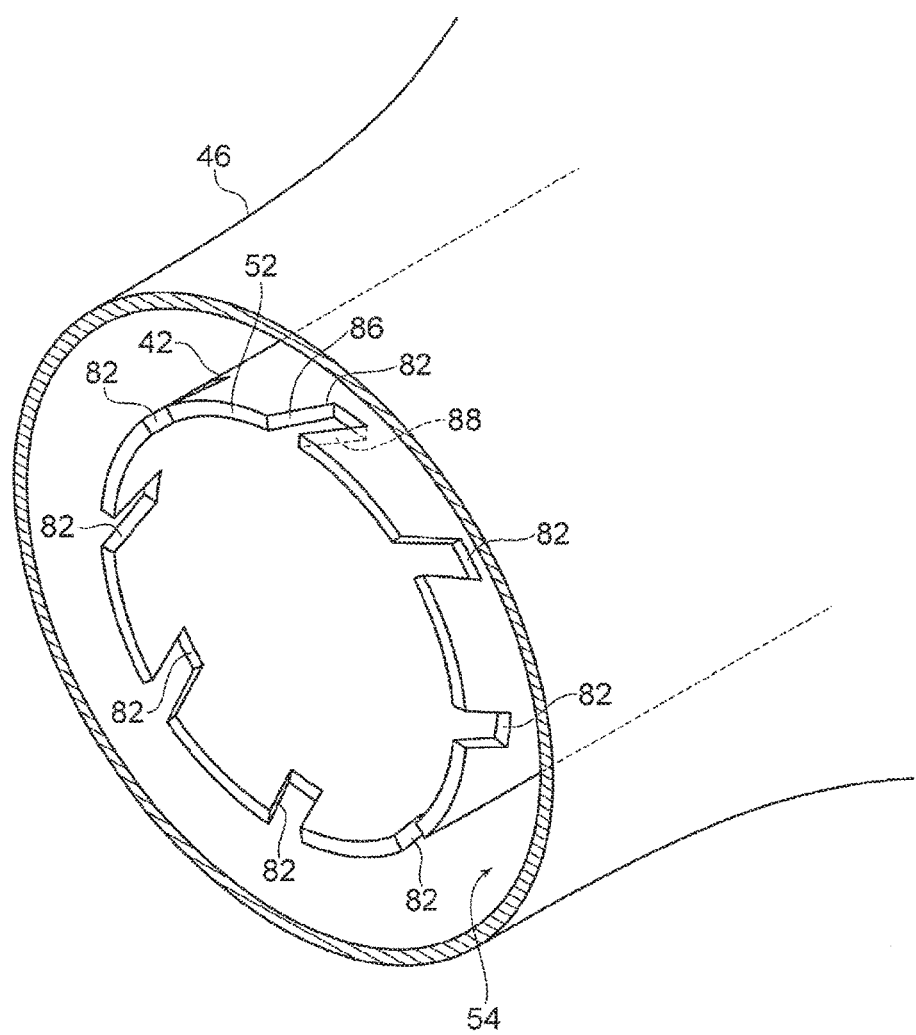
FIG. 15 is a diagram illustrating an example of another configuration of the inner side tube portion of the exhaust gas recirculation apparatus illustrated in FIG. 3 to FIG. 6, and is a cross-sectional perspective view of the exhaust gas recirculation apparatus illustrating a cross section orthogonal to the axis of the inner side tube portion at a position of the opening end of the inner side tube portion.
Figure 16:
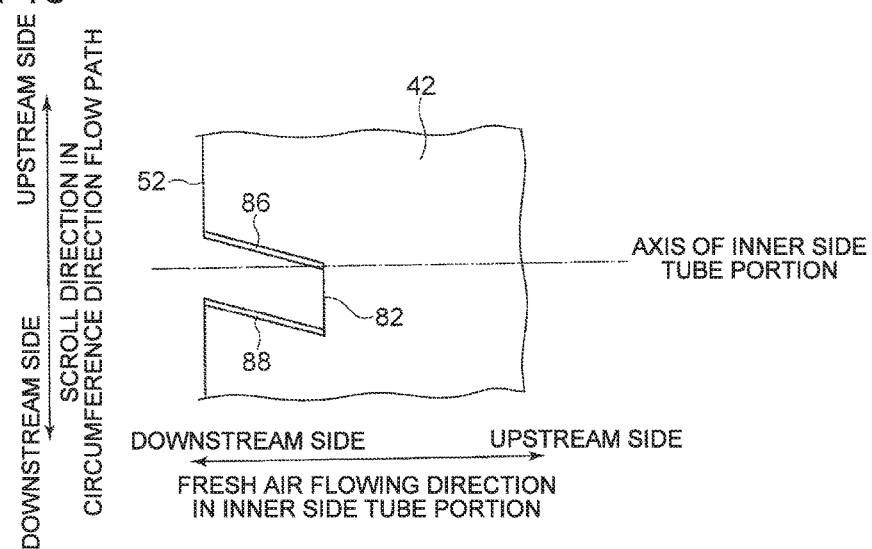
FIG. 16 is a diagram illustrating a notched portion of the inner side tube portion illustrated in FIG. 15, as viewed from an outer side of the inner side tube portion in the radial direction.
Figure 17:
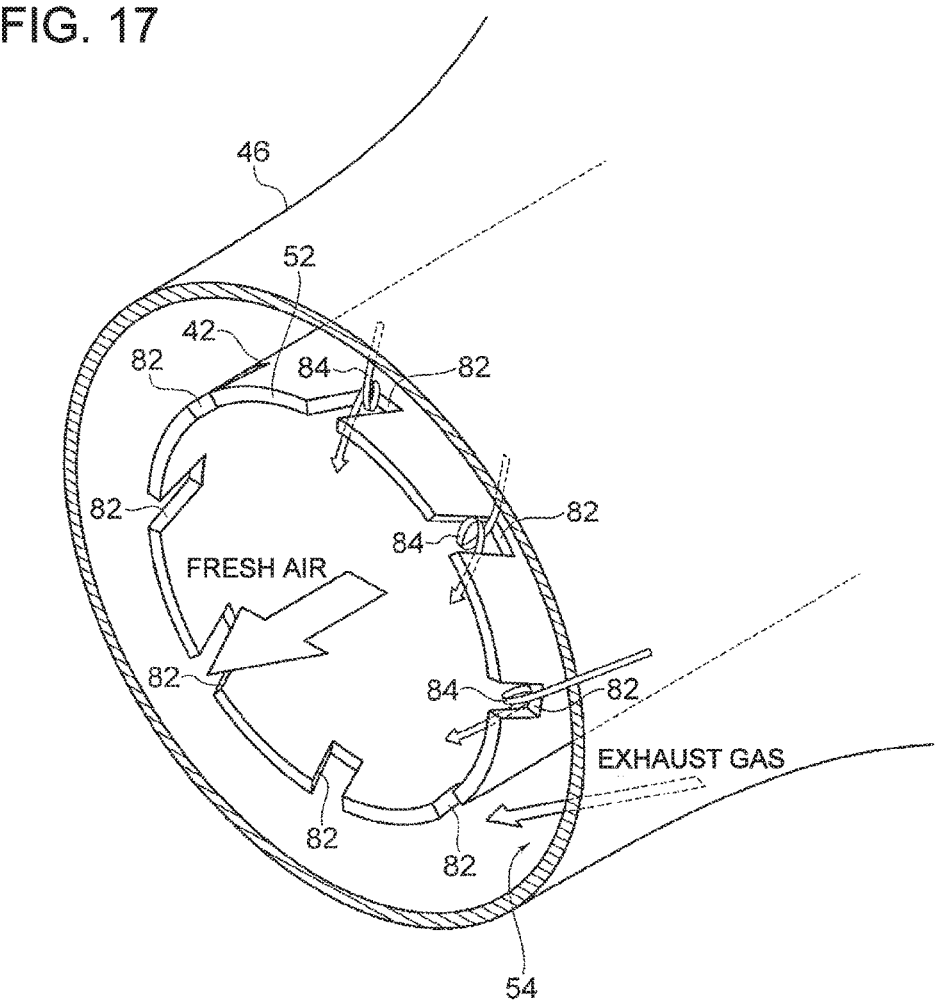
FIG. 17 is a schematic view illustrating how a streamwise vortex is generated in the notched portion illustrated in FIG. 15.

FIG. 12 is a diagram illustrating an example of a configuration of the inner side tube portion 42 of the exhaust gas recirculation apparatus 10 (64) illustrated in FIG. 3 to FIG. 6, and is a cross-sectional perspective view of the exhaust gas recirculation apparatus 10 illustrating a cross-section orthogonal to the axis of the inner side tube portion 42 at the position of the opening end 52 of the inner side tube portion 42. FIG. 13 is a diagram illustrating a notched portion 82 of the inner side tube portion 42 illustrated in FIG. 12, from an outer side of the inner side tube portion 42 in the radial direction. FIG. 14 is a schematic view illustrating how a streamwise vortex is generated in the notched portion 82 illustrated in FIG. 12. FIG. 15 is a diagram illustrating another example of the configuration of the inner side tube portion 42 of the exhaust gas recirculation apparatus 10 illustrated in FIG. 3 to FIG. 6, and is a cross-sectional perspective view of the exhaust gas recirculation apparatus 10 illustrating a cross-section orthogonal to the axis of the inner side tube portion 42 at the position of the opening end 52 of the inner side tube portion 42. FIG. 16 is a diagram illustrating the notched portion 82 of the inner side tube portion 42 illustrated in FIG. 15 as viewed from the outer side of the inner side tube portion 42 in the radial direction. FIG. 17 is a schematic view illustrating how a streamwise vortex is generated in the notched portion 82 illustrated in FIG. 15.

In some embodiments, for example, as illustrated in FIG. 12 and FIG. 15, the inner side tube portion 42 is provided with a plurality of notched portions 82, extending from the opening end 52 toward an upstream side of the inner side tube portion 42 (upstream side in a flowing direction of the fresh air flowing in the inner side tube portion 42) and arranged in the circumference direction of the inner side tube portion 42.

In this configuration, a streamwise vortex 84 of the exhaust gas is generated by the notched portions 82 extending from the opening end 52 toward the upstream side of the inner side tube portion 42, when the exhaust gas that has passed through the circumference direction flow path 54 and the fresh air that has passed through the inner side tube portion 42 merge, as illustrated in FIG. 14 and FIG. 17. Thus, the mixing of the exhaust gas and the fresh air can be facilitated while the pressure loss is prevented.

In some embodiments, the plurality of notched portions 82, illustrated in FIG. 12 and FIG. 15, are arranged at an equal interval in the circumference direction of the inner side tube portion 42. In this configuration, the exhaust gas and the fresh air can be relatively uniformly mixed regardless of the circumference direction position.

In some embodiments, for example, as illustrated in FIG. 13, each of the plurality of notched portions 82 extends in parallel with the axial direction of the inner side tube portion 42. The notched portions 82 illustrated in FIG. 12 and FIG. 13 each include: a first connection surface 86 that connects outer and inner circumference surfaces of the inner side tube portion 42 and is formed along the axial direction of the inner side tube portion 42; and a second connection surface that is formed at a position to face the first connection surface 86, connects the outer and the inner circumference surfaces of the inner side tube portion 42, and is formed along the axial direction of the inner side tube portion 42. The first and the second connection surfaces 86 and 88 are formed to be in parallel with each other and in parallel with the axial direction of the inner side tube portion 42.

In this configuration, the streamwise vortex 84 of the exhaust gas can be effectively generated by the notched portions 82 extending in parallel with the axial direction of the inner side tube portion 42, when a swirling component of the exhaust gas flowing in the circumference direction flow path 54 is relatively small (for example, when the swirling component in the direction indicated by the arrows 60 is relatively small, whereas a radial direction component in the direction indicated by the arrows 62 and an axial direction component are relatively large in FIG. 4) or is approximately zero. Thus, high effects of preventing the pressure loss and facilitating the mixing of the exhaust gas and the fresh air can be obtained when the swirling component of the exhaust gas flowing in the circumference direction flow path 54 is relatively small or is approximately zero.

In some embodiments, for example, as illustrated in FIG. 16, each of the plurality of notched portions 82 extends while being inclined with respect to the axial direction of the inner side tube portion 42 toward a downstream side in a scroll direction of the circumference direction flow path 54 (the direction indicated by the arrows 60 in FIG. 4, and in a direction moving away from the receiving position where the circumference direction flow path 54 is configured to receive the flow of the exhaust gas in the circumference direction of the inner side tube portion 42). The notched portions 82 illustrated in FIG. 15 and FIG. 16 each include: the first connection surface 86 that connects the outer and the inner circumference surfaces of the inner side tube portion 42 and is formed along the axial direction of the inner side tube portion 42; and the second connection surface 88 that is provided at a position to face the first connection surface 86, connects the outer and the inner circumference surfaces of the inner side tube portion 42, and is formed along the axial direction of the inner side tube portion 42. The first and the second connection surfaces 86 and 88 are formed in parallel with each other, and are each inclined toward the downstream side in the scroll direction of the circumference direction flow path 54 as they extend toward the upstream side in the inner side tube portion 42.

In this configuration, the streamwise vortex 84 of the exhaust gas can be effectively generated as illustrated in FIG. 17 by the notched portions 82 each extending while being inclined with respect to the axial direction of the inner side tube portion 42 toward the downstream side of the scroll direction of the circumference direction flow path 54, when the swirling component of the exhaust gas flowing in the circumference direction flow path 54 is relatively large (when the swirling component in the direction indicated by the arrows 60 is relatively large, whereas the radial direction component in the direction indicated by the arrows 62 and the axial direction component are relatively small in FIG. 4). Thus, high effects of preventing the pressure loss and preventing the mixing of the exhaust gas and the fresh air can be obtained when the swirling component of the exhaust gas flowing in the circumference direction flow path 54 is relatively large.

Figure 18:
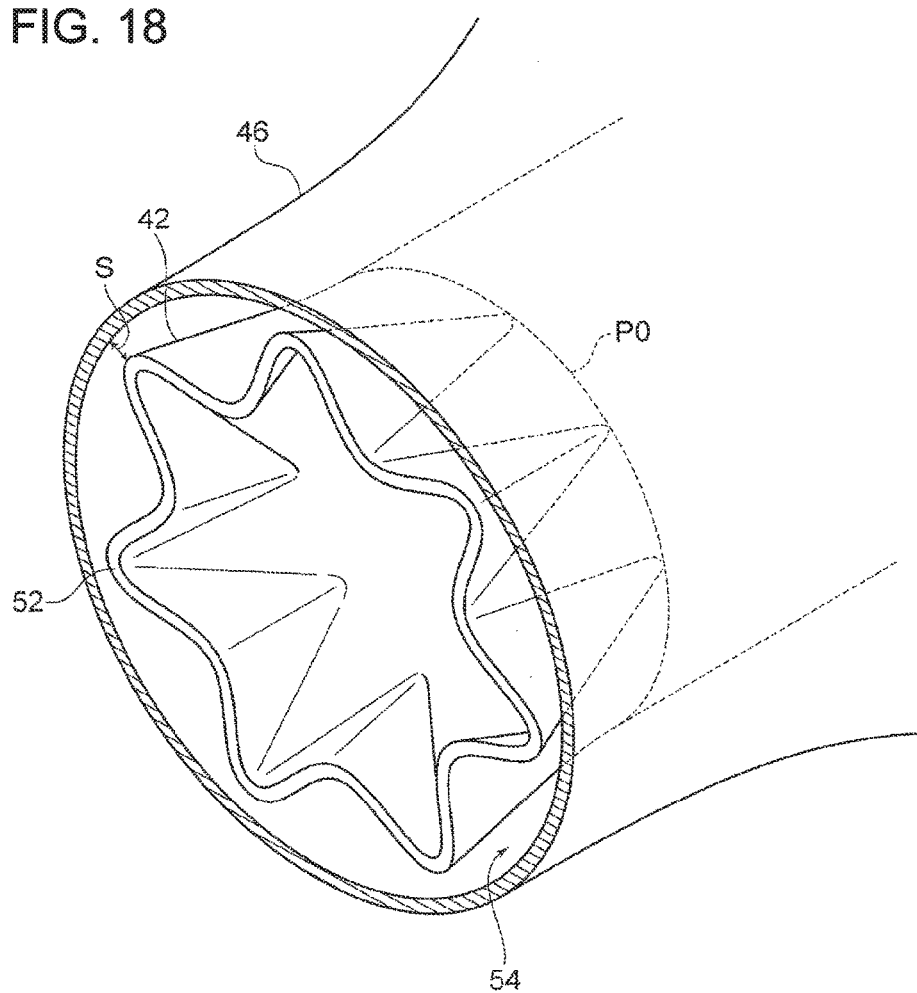
FIG. 18 is a diagram illustrating an example of another configuration of the inner side tube portion of the exhaust gas recirculation apparatus illustrated in FIG. 3 to FIG. 6, and is a cross-sectional perspective view of the exhaust gas recirculation apparatus illustrating a cross section orthogonal to the axis of the inner side tube portion at a position of the opening end of the inner side tube portion.
Figure 19:
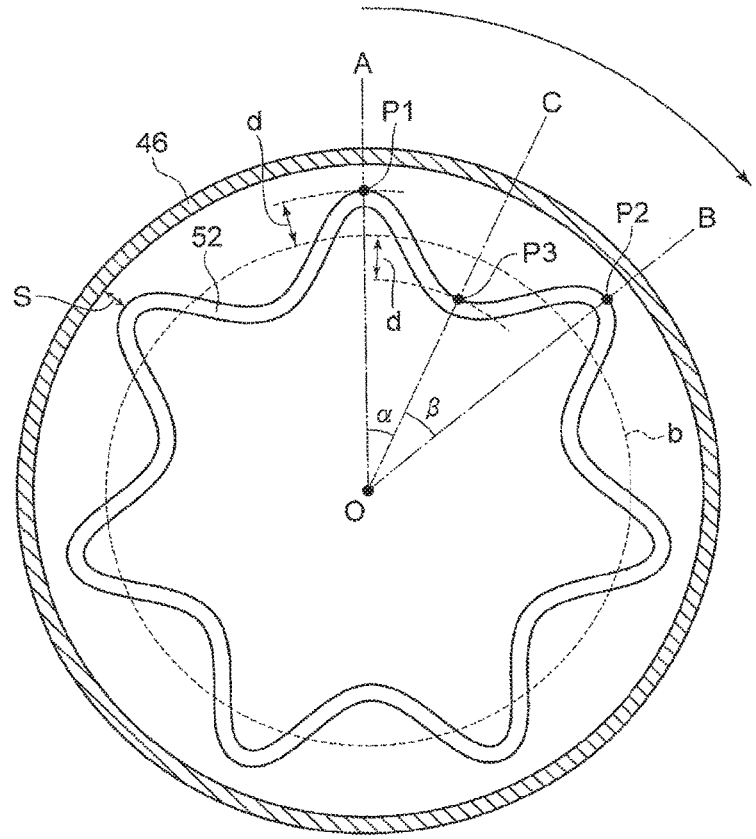
FIG. 19 is a diagram illustrating the opening end of the inner side tube portion illustrated in FIG. 18 as viewed in an axial direction of the inner side tube portion from a downstream side.

FIG. 18 is a diagram illustrating an example of a configuration of the inner side tube portion 42 of the exhaust gas recirculation apparatus 10 (64) illustrated in FIG. 3 to FIG. 6, and is a cross-sectional perspective view of the exhaust gas recirculation apparatus 10 illustrating a cross section orthogonal to the axis of the inner side tube portion 42 at the position of the opening end 52 of the inner side tube portion 42. FIG. 19 is a diagram illustrating the opening end 52 of the inner side tube portion 42 illustrated in FIG. 18 as viewed from the downstream side in the axial direction of the inner side tube portion 42.

In some embodiments, for example, as illustrated in FIG. 18 and FIG. 19, the opening end 52 has a wave shape so that a distance S between the opening end 52 and the surrounding portion 46 in the radial direction of the inner side tube portion 42 periodically changes along the circumference direction of the inner side tube portion 42. The wave of the wave shape of the inner side tube portion 42 has an amplitude d (see FIG. 19) reducing toward the upstream side in the axial direction from the opening end 52, and being 0 at a predetermined position P0 in the axial direction (a tubular shape is achieved). The amplitude d is defined as a distance in the radial direction from a first position P1 (a distance in the radial direction from a third position P3) described later and a virtual circle b centered on an axis O of the inner side tube portion 42, the distance in the radial direction from the virtual circle b to the first position P1 being equal to the distance in the radial direction from the virtual circle b to the third position P3.

Figure 20:
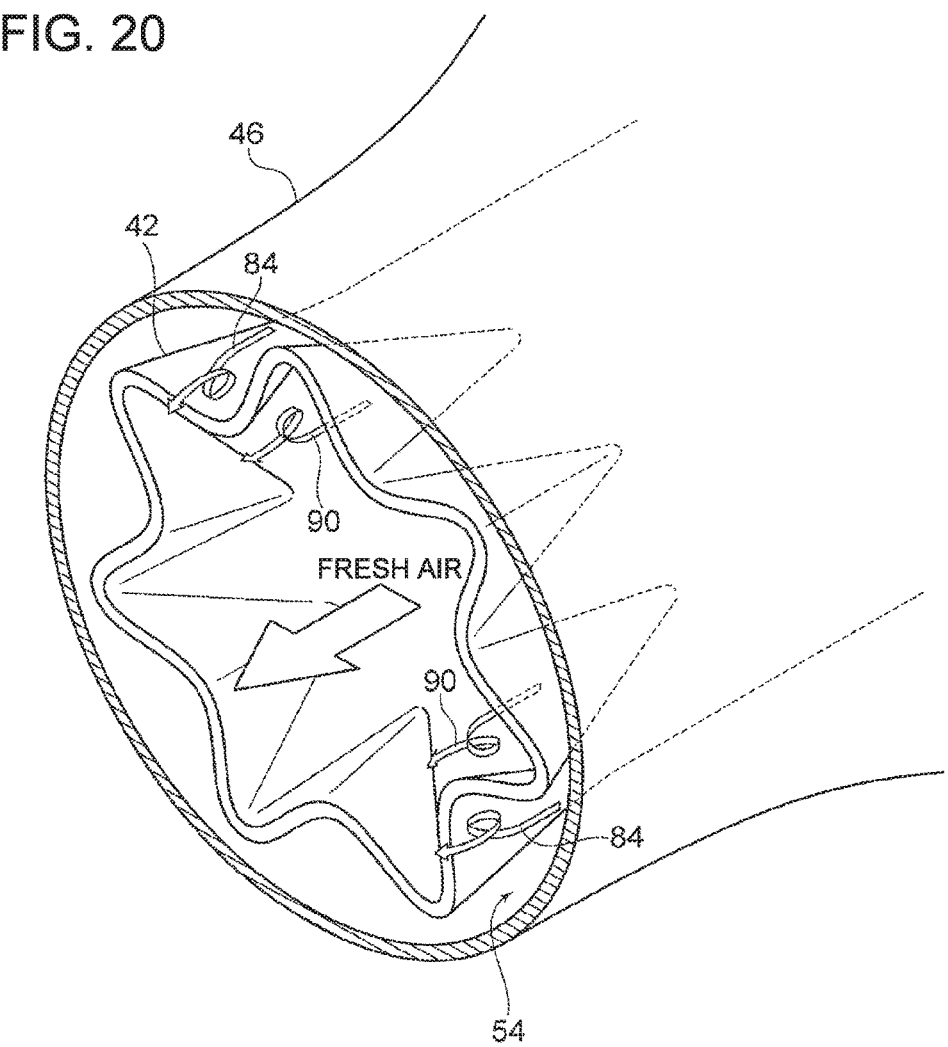
FIG. 20 is a schematic view illustrating how a streamwise vortex is generated on inner and outer sides of the opening end of the inner side tube portion illustrated in FIG. 18.

In this configuration, the distance S between the opening end 52 and the surrounding portion 46 in the radial direction of the inner side tube portion 42 periodically changes along the circumference direction of the inner side tube portion 42. Thus, the streamwise vortex 84 of the exhaust gas and a streamwise vortex 90 of the fresh air are alternately generated along the circumference direction of the inner side tube portion 42 at the position where the exhaust gas and the fresh air merge, as illustrated in FIG. 20. Thus, the mixing of the exhaust gas and the fresh air can be facilitated while the pressure loss is prevented.

In the embodiment illustrated in FIG. 19, an angle $\alpha$ between a straight line A and a straight line C is equal to an angle $\beta$ between a straight line B and the straight line C. The straight line A is a straight line connecting the axis O of the inner side tube portion 42 and a first position P1 on the opening end 52 where the distance to the surrounding portion 46 is the smallest. The straight line B is a straight line connecting the axis of the inner side tube portion 42 and one of second positions on the opening end 52 where the distance to the surrounding portion 46 is the smallest, the one of second positions P2 being disposed adjacent to and on a downstream side of the first position P1 in the scroll direction of the circumference direction flow path 54. The straight line C is a straight line connecting the axis of the inner side tube portion 42 and one of third positions P3 on the opening end 52 where the distance to the surrounding portion 46 is the largest, the one of third positions P3 being positioned between the first position P1 and the second position P2 in the scroll direction of the circumference direction flow path 54.

Figure 21:
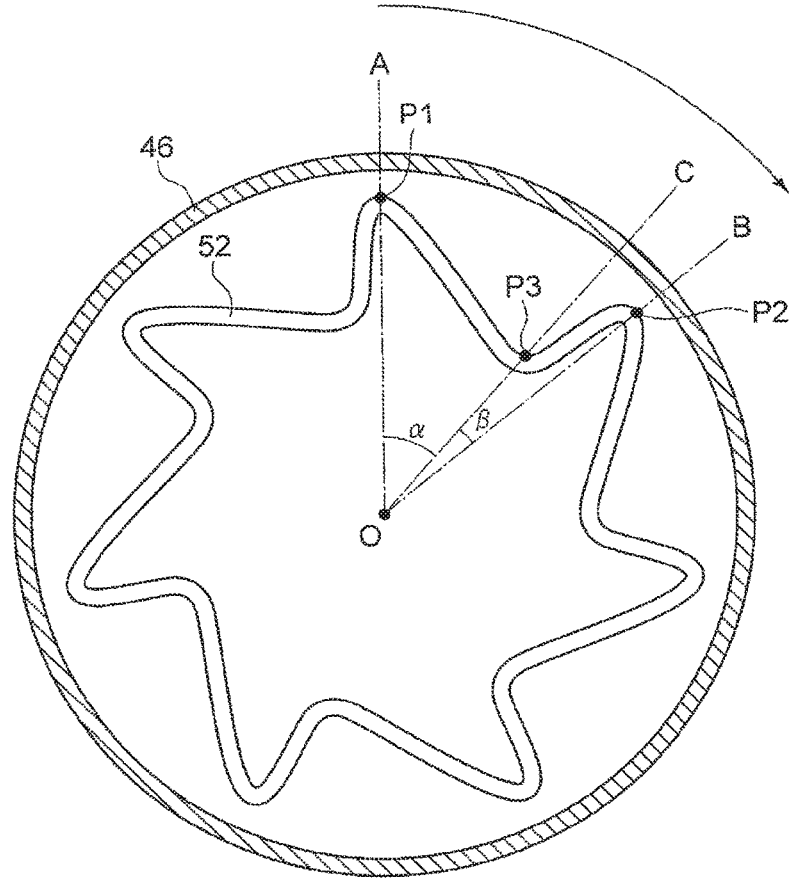
FIG. 21 is a diagram illustrating an example of another configuration of the inner side tube portion of the exhaust gas recirculation apparatus illustrated in FIG. 3 to FIG. 6, and is a cross-sectional perspective view of the exhaust gas recirculation apparatus illustrating a cross section orthogonal to the axis of the inner side tube portion at a position of the opening end of the inner side tube portion.

Alternatively, as illustrated in FIG. 21 for example, the opening end 52 of the inner side tube portion 42 may be formed in such a manner that the angle $\alpha$ between the straight line A and the straight line C, defined in the embodiment illustrated in FIG. 19, is larger than the angle $\beta$ between the straight line B and the straight line C.

In this configuration, each wave of the opening end 52 having the wave shape is inclined so that $\alpha > \beta$ is satisfied. Thus, the streamwise vortex 84 of the exhaust gas can be effectively generated, when the swirling component of the exhaust gas flowing in the circumference direction flow path 54 is relatively large (when the swirling component in the direction indicated by the arrows 60 is relatively large, whereas the radial direction component in the direction indicated by the arrows 62 and the axial direction component are relatively small in FIG. 4). Thus, high effects of preventing the pressure loss and preventing the mixing of the exhaust gas and the fresh air can be obtained when the swirling component of the exhaust gas flowing in the circumference direction flow path 54 is relatively large.

The present invention is not limited to the above-described embodiments, and includes embodiments obtained by modifying the above-described embodiments as well as modes obtained by appropriately combining the above-described embodiments.

DESCRIPTION OF REFERENCE NUMERALS

10 Exhaust gas recirculation apparatus
12 Engine system
14 Engine
16 Turbocharger
18 Turbine
20 Compressor
22 Upstream side intake path
24 Air supply manifold
26 Downstream side intake path
28 Discharge manifold
30 Intake air cooling heat exchanger
32 Discharge air recirculating path
34 Discharge air cooling heat exchanger
36 Control valve
38 Fresh air inlet portion
40 Fresh air throttle portion
42 Inner side tube portion
44 Exhaust gas inlet portion
46 Surrounding portion
48 Outlet portion
50 Circumference wall
52 Opening end
54 Circumference direction flow path
56 Merging flow path
58 Opening
72 Throttle valve
74 Pipe
76 Mixing facilitating portion
78 Exhaust gas recirculation tubular pipe
80 Communication pipe
82 Notched portion
84 Streamwise vortex
86 First connection surface
88 Second connection surface
90 Streamwise vortex

The invention claimed is:

1. An exhaust gas recirculation apparatus configured to merge exhaust gas discharged from an engine with fresh air supplied to the engine, the exhaust gas recirculation apparatus comprising:
   a fresh air inlet portion configured to receive a flow of the fresh air;
   a fresh air throttle portion that continues from the fresh air inlet portion and is configured to throttle the flow of the fresh air;
   an inner side tube portion that continues from the fresh air throttle portion, has a tubular shape and has an opening end disposed on a side opposite to the fresh air throttle portion;
   an exhaust gas inlet portion configured to receive a flow of the exhaust gas;
   a surrounding portion that continues from the exhaust gas inlet portion, surrounds the inner side tube portion and defines a circumference direction flow path for the exhaust gas extending along an outer circumference surface of the inner side tube portion; and
   an outlet portion that continues from the surrounding portion, has a tubular shape, and defines a merging flow path configured to receive the flow of the fresh air flowing out from the opening end of the inner side tube portion and the flow of the exhaust gas flowing out from the circumference direction flow path,
   wherein an annular opening is defined between the opening end of the inner side tube portion and the surrounding portion, the annular opening extending along the opening end of the inner side tube portion and connecting the circumference direction flow path and the merging flow path,
   wherein the inner side tube portion is configured to make the exhaust gas and the fresh air flow along an axial direction of the inner side tube portion,
   wherein the inner side tube portion is provided with a plurality of notched portions formed along a circumference direction of the inner side tube portion, the plurality of notched portions extending from the opening end toward an upstream side of the inner side tube portion and communicating an inside of the inner side tube portion through which the fresh air flows and the circumference direction flow path in a radial direction of the inner side tube portion.

2. The exhaust gas recirculation apparatus according to claim 1,
   wherein a flow path cross-sectional area of the exhaust gas inlet portion, a flow path cross-sectional area of the circumference direction flow path, and an area of the annular opening are set in such a manner that a flow velocity of the fresh air flowing out from the opening end of the inner side tube portion becomes equal to a flow velocity of the exhaust gas flowing out from the annular opening when a load of the engine is within a predetermined range.

3. The exhaust gas recirculation apparatus according to claim 1, further comprising at least one protruding portion protruding from an inner circumference surface of the outlet portion.

4. The exhaust gas recirculation apparatus according to claim 1,
   wherein the opening end has a wave shape with which a distance between the opening end and the surrounding portion in a radial direction of the inner side tube portion periodically changes along a circumference direction of the inner side tube portion.

5. The exhaust gas recirculation apparatus according to claim 1, wherein the exhaust gas inlet portion is configured in such a manner that the exhaust gas flows into the receiving position of the circumference direction flow path along a tangential direction of the inner side tube portion.

6. The exhaust gas recirculation apparatus according to claim 1,
   wherein each of the plurality of notched portions includes:
   a first connection surface that connects outer and inner circumference surfaces of the inner side tube portion and is formed along the axial direction of the inner side tube portion; and
   a second connection surface that is formed at a position to face the first connection surface, connects the outer and the inner circumference surfaces of the inner side tube portion, and is formed along the axial direction of the inner side tube portion,
   the first and the second connection surfaces and being formed to be in parallel with each other and in parallel with the axial direction of the inner side tube portion or the first and the second connection surfaces and being formed in parallel with each other, and being each inclined toward a downstream side in a scroll direction of the circumference direction flow path as they extend toward the upstream side in the inner side tube portion.

7. The exhaust gas recirculation apparatus according to any one of claim 1,
wherein the circumference direction flow path has a flow path cross-sectional area that decreases gradually from a receiving position where the circumference direction flow path receives the flow of the exhaust gas in a circumference direction of the inner side tube portion.

8. The exhaust gas recirculation apparatus according to claim 1,
wherein the plurality of notched portions are formed at an equal interval along the circumference direction of the inner side tube portion.

9. The exhaust gas recirculation apparatus according to claim 1,
wherein each of the plurality of notched portions extends in parallel with the axial direction of the inner side tube portion.

10. The exhaust gas recirculation apparatus according to claim 1, wherein each of the plurality of notched portions extends while being inclined with respect to the axial direction of the inner side tube portion, toward a downstream side in a scroll direction of the circumference direction flow path.

11. An engine system comprising:
an engine;
a turbocharger configured to compress fresh air supplied to the engine by using energy of at least a part of exhaust gas discharged from the engine; and
an exhaust gas recirculation apparatus configured to merge exhaust gas discharged from an engine with fresh air supplied to the engine, the exhaust gas recirculation apparatus comprising:
a fresh air inlet portion configured to receive a flow of the fresh air;
a fresh air throttle portion that continues from the fresh air inlet portion and is configured to throttle the flow of the fresh air;
an inner side tube portion that continues from the fresh air throttle portion, has a tubular shape and has an opening end disposed on a side opposite to the fresh air throttle portion;
an exhaust gas inlet portion configured to receive a flow of the exhaust gas;
a surrounding portion that continues from the exhaust gas inlet portion, surrounds the inner side tube portion and defines a circumference direction flow path for the exhaust gas extending along an outer circumference surface of the inner side tube portion; and
an outlet portion that continues from the surrounding portion, has a tubular shape, and defines a merging flow path configured to receive the flow of the fresh air flowing out from the opening end of the inner side tube portion and the flow of the exhaust gas flowing out from the circumference direction flow path,
wherein an annular opening is defined between the opening end of the inner side tube portion and the surrounding portion, the annular opening extending along the opening end of the inner side tube portion and connecting the circumference direction flow path and the merging flow path,
wherein the inner side tube portion is configured to make the exhaust gas and the fresh air flow along an axial direction of the inner side tube portion,
wherein the inner side tube portion is provided with a plurality of notched portions formed along a circumference direction of the inner side tube portion, the plurality of notched portions extending from the opening end toward an upstream side of the inner side tube portion and communicating an inside of the inner side tube portion through which the fresh air flows and the circumference direction flow path in a radial direction of the inner side tube portion.

12. An exhaust gas recirculation apparatus comprising:
an exhaust gas recirculation tubular pipe to which an EGR control valve having two outlets, a throttle valve, and an air supply manifold are connected; and
a mixing facilitating portion disposed between the EGR control valve and the exhaust gas recirculation tubular pipe,
wherein the mixing facilitating portion includes two communication pipes connected to the exhaust gas recirculation tubular pipe in two different tangential directions, respectively,
wherein the tangential directions are mirror symmetric with each other in a cross-sectional view of the exhaust gas recirculation tubular pipe, and
wherein an angle between the two communication pipes in the cross-sectional view of the exhaust gas recirculation tubular pipe is equal to or smaller than 90°.

13. An exhaust gas recirculation apparatus configured to merge exhaust gas discharged from an engine with fresh air supplied to the engine, the exhaust gas recirculation apparatus comprising:
a fresh air inlet portion configured to receive a flow of the fresh air;
a fresh air throttle portion that continues from the fresh air inlet portion and is configured to throttle the flow of the fresh air;
an inner side tube portion that continues from the fresh air throttle portion, has a tubular shape and has an opening end disposed on a side opposite to the fresh air throttle portion;
an exhaust gas inlet portion configured to receive a flow of the exhaust gas;
a surrounding portion that continues from the exhaust gas inlet portion, surrounds the inner side tube portion, and defines a circumference direction flow path for the exhaust gas extending along an outer circumference surface of the inner side tube portion; and
an outlet portion that continues from the surrounding portion, has a tubular shape, and defines a merging flow path configured to receive the flow of the fresh air flowing out from the opening end of the inner side tube portion and the flow of the exhaust gas flowing out from the circumference direction flow path, wherein an annular opening is defined between the opening end of the inner side tube portion and the surrounding portion, the annular opening extending along the opening end of the inner side tube portion and connecting the circumference direction flow path and the merging flow path,
wherein the inner side tube portion is configured to make the exhaust gas and the fresh air flow along an axial direction of the inner side tube portion, and
wherein the opening end has a wave shape with which a distance between the opening end and the surrounding portion in a radial direction of the inner side tube portion periodically changes along a circumference direction of the inner side tube portion, and
wherein an angle $\alpha$ between a straight line A and a straight line C is larger than an angle $\beta$ between a straight line B and the straight line C, where the straight line A is a straight line connecting an axis of the inner side tube portion and a first position on the opening end where the distance to the surrounding portion is the smallest, the straight line B is a straight line connecting the axis of the inner side tube portion and one of second positions on the opening end where the distance to the surrounding portion is the smallest, the one of second positions being disposed adjacent to and on a downstream side of the first position in a scroll direction of the circumference direction flow path, and the straight line C is a straight line connecting the axis of the inner side tube portion and one of third positions on the opening end where the distance to the surrounding portion is the largest, the one of third positions being positioned between the first position and the second position in the scroll direction of the circumference direction flow path.

* * * * *